June 24, 1958 — W. F. BORN ET AL — 2,840,630
BUS DUCT
Filed Jan. 12, 1952 — 2 Sheets-Sheet 1
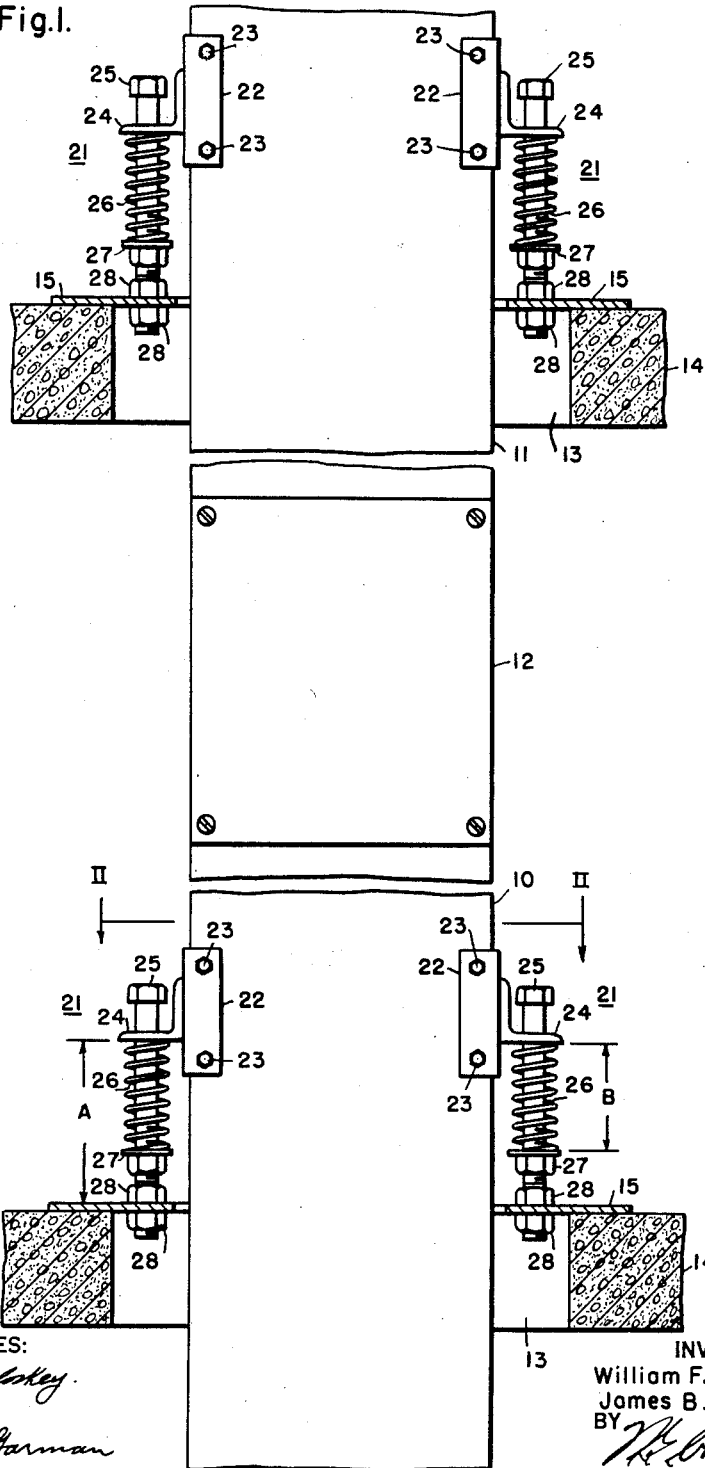
Fig.1.
WITNESSES:
INVENTORS
William F. Born and
James B. Wallace.
BY 
ATTORNEY June 24, 1958    W. F. BORN ET AL    2,840,630
BUS DUCT
Filed Jan. 12, 1952    2 Sheets-Sheet 2
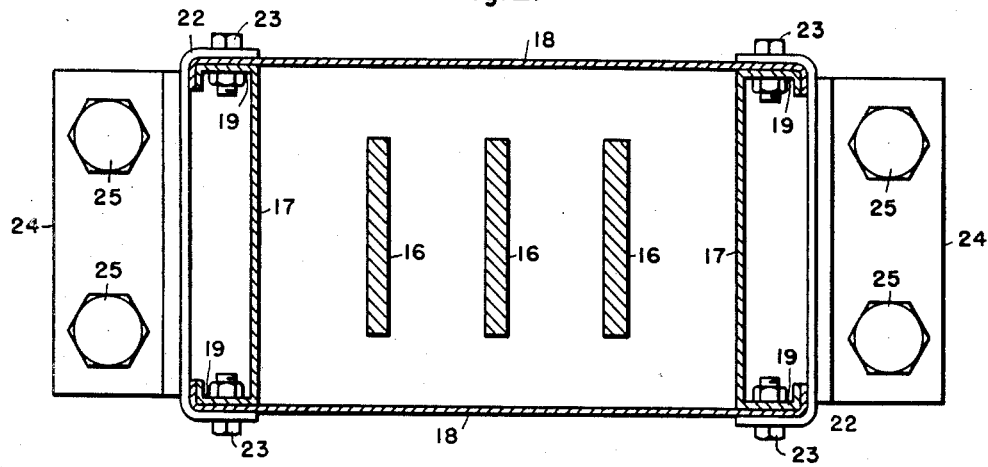
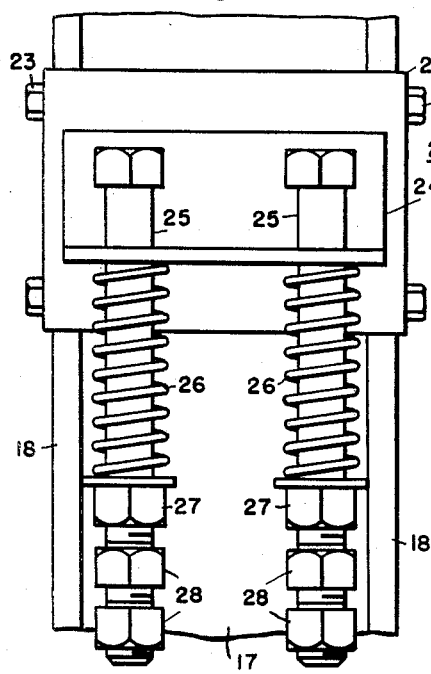
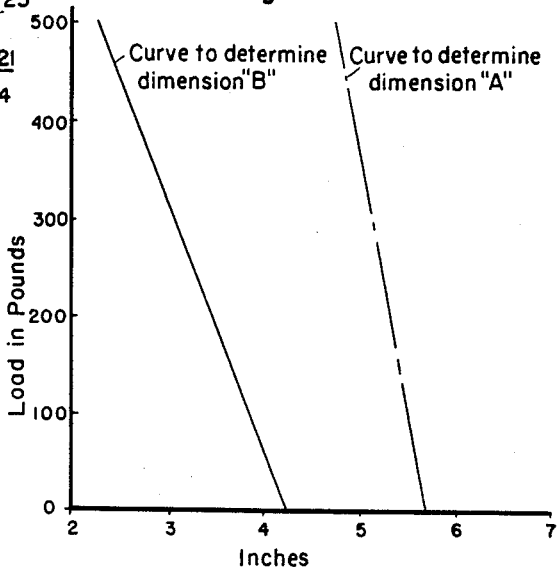
WITNESSES:
E. A. McCloskey
Leon M. Garman
INVENTORS
William F. Born and
James B. Wallace.
BY
ATTORNEY

United States Patent Office 2,840,630
Patented June 24, 1958

2,840,630

BUS DUCT

William F. Born and James B. Wallace, Beaver, Pa., assignors to Westinghouse Electric Corporation, East Pittsburgh, Pa., a corporation of Pennsylvania Application January 12, 1952, Serial No. 266,176

6 Claims. (Cl. 174—100)

Our invention relates, generally, to bus duct and, more particularly, to hangers or supports for vertically disposed bus duct of the type wherein bus bars are enclosed in a metal duct or housing.

Heretofore, vertical runs of bus duct have been supported by angle bars welded to the duct housing and resting directly on a supporting member, such as a floor plate. One disadvantage of the foregoing method is the delay usually encountered in obtaining exact hanger locations for a building under construction. After the information is obtained, special lengths of duct must be manufactured with the hangers welded at the proper locations. Another disadvantage is the problem of equalizing the load carried by each set of hangers, which is made difficult by varying floor thicknesses. Also, provision must be made for expansion and contraction of the duct caused by changes in its temperature.

An object of our invention, generally stated, is to provide a bus duct hanger which shall be simple and efficient in operation and which may be economically manufactured and installed.

A more specific object of our invention is to provide an adjustable hanger for supporting vertically disposed bus duct.

Another object of our invention is to provide for equalizing the load carried by hangers supporting vertically disposed bus duct.

A further object of our invention is to provide for removably attaching a hanger to a bus duct housing without affecting electrical clearances.

Other objects of our invention will be explained fully hereinafter or will be apparent to those skilled in the art.

In accordance with one embodiment of our invention a vertical run of bus duct is supported by angle-shaped hangers disposed at suitable locations along the duct, such as the floor levels of a building. Each hanger is removably attached to the duct housing by a C-shaped clamp bolted to exterior portions of the housing when the duct is installed, thereby permitting it to be located properly on the job with respect to the floor plate or other supporting structure. The weight of the duct is carried by springs disposed on bolts slidably mounted in the angle member and adjustably connected to the supporting structure.

For a better understanding of the nature and objects of the invention, reference may be had to the following detailed description, taken in conjunction with the accompanying drawings, in which:

Figure 1 is a view, partly in section and partly in front elevation, of a portion of a vertical bus duct and its supports embodying the principal features of our invention;

Fig. 2 is an enlarged view, in section, taken along the line II—II in Fig. 1;

Fig. 3 is an enlarged detail view, in side elevation, of one of the supporting hangers, and Fig. 4 is a chart for determining the location and the adjustment of the hangers.

Referring to the drawings, and particularly to Fig. 1, the structure shown therein comprises portions of two sections, 10 and 11, of a vertically disposed bus duct installation. The two sections or lengths shown are connected by a joint 12 in the usual manner. It will be understood that as many sections as required may be provided and mounted in the manner shown.

As shown, the bus duct extends vertically through openings 13 provided in floors 14 of a building or other structure. In the present structure, the bus duct is supported by floor plates 15 disposed over the openings 13 in the floors of the building. It will be understood that the bus duct may be supported by other means such as brackets or angle members attached to the vertical columns of a building or other structure.

As shown most clearly in Fig. 2, each section of the bus duct comprises bus bars 16 enclosed in a metal housing which comprises spaced channel members 17 and cover plates 18 attached to the channel members 17. The channel members 17 have outwardly extending flanges 19 which are overlapped by the cover plates 18. The bus bars 16 may be supported by insulators disposed inside the housing in the usual manner.

As shown in Fig. 1, the bus duct is supported by a plurality of hangers 21 which are removably attached to the bus duct. A set of hangers 21 may be provided at each floor level or other supporting point for the bus duct. As previously explained, one of the problems encountered heretofore has been properly attaching the hangers to the bus duct with respect to the location of the supports for the bus duct in the building or other structure. Before hangers could be permanently attached to the bus duct during the manufacturing of the duct, as has been done in the past, it was necessary to know the exact location of the supports in the building. Further difficulties were encountered because of variations in the floor thickness in the buildings.

In order to overcome these difficulties, we have provided for attaching the hangers 21 to the bus duct by means of C-shaped clamps 22 which are attached to the bus duct housing by means of bolts 23 which extend through the flanges 19 externally of the bus duct housing. Since the bolts 23 extend through the flanges 19 externally of the housing, they do not interfere with electrical clearances between the bus bar and the housing, and it is not necessary to get into the duct to apply the nuts to the bolts. Furthermore, they do not permit the entrance of dirt or other foreign matter into the housing.

As shown most clearly in Fig. 3, each hanger 21 comprises an angle member 24, one leg of which is welded to the C-shaped clamp 22 and the other leg of which has openings therein for bolts 25 slidably disposed in the angle member 24. A compression spring 26 is disposed on each bolt 25 between the angle member 24 and a nut 27 threaded into the bolt 25. Two other nuts 28 are also threaded onto the end of the bolt 25.

As shown in Fig. 1, the nuts 28 are utilized for attaching the bolts 25 to the supporting plate 15. It will be understood that they may be utilized for attaching the bolts to other suitable means for supporting the bus duct.

As shown in Figs. 1 and 4, the clamps 22 may be located on the bus duct housing by utilizing the curve shown in Fig. 4 for determining dimension "A" which is the recommended distance between the angle member 24 and the supporting plate 15. As shown by the curve in Fig. 4, the dimension "A" varies with the load carried by the hanger. The load on the hanger depends on the size and weight of each section of duct which, in turn, depends upon the rating of the duct. Thus, by utilizing the curve shown in Fig. 4, workmen can properly locate the hanger on the duct housing and attach it thereto by drilling holes through the flanges in the housing and inserting the bolts 23 into the holes.

As also shown in Figs. 1 and 4, the compression of each spring 26 may be adjusted by means of the nut 27 to equalize the load carried by the hangers which support a bus duct run. The nuts 27 may be adjusted by utilizing the curve in Fig. 4 for determining dimension "B" which is the recommended distance between the nut 27 and the angle member 24 for each hanger. Thus, the load carried by each hanger may be adjusted to compensate for variations in floor thickness or distances between supports to which the hangers are attached. It will be noted that the recommended distance for dimension "B" varies with the load carried by each hanger.

The springs 26 also take care of expansion and contraction of the bus duct caused by temperature changes. It will be understood that other spacing means may be utilized in place of the springs 26. Also, as previously explained, other means of supporting the bus duct may be utilized in place of the floor plates 15.

From the foregoing description, it is apparent that we have provided for supporting vertically disposed bus ducts in buildings or other structures by hangers which may be readily attached to the bus duct when it is being installed, thereby making it unnecessary to delay the manufacturing of the duct until information is available on the location of the supports for the duct. The hangers are attached to the duct in a manner which does not interfere with electrical clearances and which does not permit the entrance of foreign matter into the duct housing. Furthermore, the duct may be removed from one location and installed in another location by changing the position of the hangers on the duct housing if necessary. The hangers may be readily adjusted to equalize the load carried by all the hangers which support the vertical run of duct.

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In a bus duct, in combination, a housing having spaced channel members with outwardly extending flanges, cover members attached to the channel members, a generally C-shaped clamp having spaced arms spanning the housing and bolted to the channel flanges exteriorly of the housing, said arms being in planes parallel to the cover members, an angle-shaped bracket having one leg secured to the clamp and an opening in the other leg, a bolt slidably disposed in the opening and movable in a direction along the length of the housing, threaded means on the bolt for connecting it to a supporting structure, and a compression spring disposed on the bolt between said threaded means and said bracket.

2. Bus duct for mounting on a plurality of supports spaced vertically, comprising a plurality of generally rectangular duct housing sections connected end-to-end, each of said duct sections having a flange projecting outwardly therefrom and extending longitudinally thereof and in a vertical direction when the duct sections are mounted between said vertically spaced supports, a plurality of mounting members having arms attached to said vertically extending flanges of the housing sections at spaced points along the length of the duct, said arms lying in planes parallel to opposite sides of the housing, said mounting members being attached to said vertically extending flanges by horizontally disposed bolts extending through the flanges and being positioned wholly outside of the duct, the distance between mounting members being substantially equal to the distance between supports, and a plurality of supporting means each adjustably mounted in a vertical direction to one of said mounting members for attaching to one of said supports to equalize the division of load between the mounting members.

3. Bus duct for mounting on a plurality of supports spaced vertically, comprising a plurality of generally rectangular duct housing sections connected end-to-end, a plurality of clamps having arms attached to the housing sections at spaced points along the length of the duct, said arms lying in planes parallel to opposite sides of the housing, the distance between clamps being substantially equal to the distance between supports, a plurality of bolts slidably disposed in said clamps for attaching to said supports, and resilient means adjustably mounted on said bolts to equalize the division of load between said clamps.

4. Bus duct for mounting on a plurality of supports spaced vertically, comprising a plurality of generally rectangular duct housing sections connected end-to-end, each of said duct sections having a flange projecting outwardly therefrom and extending longitudinally thereof and in a vertical direction when the duct sections are mounted between said vertically spaced supports, a plurality of mounting members having arms attached to said vertically extending flanges of the housing sections at spaced points along the length of the duct, said arms lying in planes parallel to opposite sides of the housing, said mounting members being attached to said vertically extending flanges by horizontally disposed bolts extending through the flanges and being positioned wholly outside of the duct, the distance between mounting members being substantially equal to the distance between supports, a plurality of bolts slidably disposed in each of said mounting members for attaching to one of said supports, a spring surrounding each bolt, and threaded means for adjusting the compression of each spring to equalize the division of load between the mounting members.

5. In a bus duct, in combination, an expansible housing having spaced channel members with outwardly extending flanges, cover members attached to the channel members, electrical bus bars enclosed in and electrically insulated from the housing, a clamp, a bolt for attaching the clamp to a channel flange, both ends of the bolt being disposed exteriorly of the housing space occupied by the bus bars, a bracket portion on the clamp, said bracket portion having an opening therein, supporting means movable through said opening in a direction along the length of the housing and bus bars for movably connecting the bracket to a supporting structure, and a compression spring cooperating with the supporting means to permit expansion of the housing.

6. In a bus duct, in combination, a metal housing subject to expansion and contraction caused by changes in its temperature, said housing having spaced channel members with outwardly extending flanges, cover members attached to the channel members, electrical bus bars enclosed in and electrically insulated from the housing, a clamp bolted to the channel flanges exteriorly of the housing space occupied by the bus bars, a bracket secured to the clamp and having an opening therein, a bolt slidably disposed in the opening and movable in a direction along the length of the housing and bus bars, a nut threaded on one end of the bolt, and a compression spring mounted on the bolt between the nut and the bracket to permit expansion and contraction of the housing.

References Cited in the file of this patent

UNITED STATES PATENTS

| | | |
|---|---|---|
| 799,320 | Franks | Sept. 12, 1905 |
| 849,975 | Carlson | Apr. 9, 1907 |
| 1,591,940 | Joyce | July 6, 1926 |
| 1,763,682 | Wallace | June 17, 1930 |

(Other references on following page)

UNITED STATES PATENTS

| | | |
|---|---|---|
| 1,929,700 | Malone | Oct. 10, 1933 |
| 2,191,071 | Duttera | Feb. 20, 1940 |
| 2,223,300 | De Bellis | Nov. 26, 1940 |
| 2,306,353 | Cole et al. | Dec. 22, 1942 |
| 2,341,311 | Carlson | Feb. 8, 1944 |
| 2,353,763 | Rodman | July 18, 1944 |
| 2,445,424 | Fountain | July 20, 1948 |
| 2,613,896 | Witt | Oct. 14, 1952 |
| 2,708,686 | Bernard | May 17, 1955 |

FOREIGN PATENTS

| | | |
|---|---|---|
| 64,099 | Austria | 1914 |